United States Patent [19]
Versaci et al.

[11] 3,739,636
[45] June 19, 1973

[54] LINEAR READOUT FLOWMETER

[75] Inventors: Antonio A. Versaci, 1092 St. Jude Drive, Schenectady, N.Y. 12303; Paul Zucchino, Princeton, N.J.

[73] Assignee: said Versaoi, by said Zucchino, Schenectady, N.Y.

[22] Filed: Jan. 22, 1971

[21] Appl. No.: 108,717

[52] U.S. Cl. .......................... 73/194 E, 235/151.34
[51] Int. Cl. ................................................ G01f 1/00
[58] Field of Search ..................... 73/194 R, 194 F, 73/194 E, 194 A; 324/160, 178, 189, 83 D, 163, 181; 235/151.32, 151.34

[56] References Cited
UNITED STATES PATENTS

| | | | |
|---|---|---|---|
| 2,480,646 | 8/1949 | Grabau | 73/194 A |
| 2,699,677 | 1/1955 | McCallum et al. | 73/194 A |
| 3,403,555 | 10/1968 | Versaci et al. | 73/194 E |
| 3,588,699 | 6/1971 | Pysnik | 73/194 E |
| 3,258,961 | 7/1966 | Van Manen | 73/136 A |
| 2,628,348 | 2/1953 | Page | 324/189 X |

FOREIGN PATENTS OR APPLICATIONS

| | | | |
|---|---|---|---|
| 780,738 | 8/1957 | Great Britain | 324/189 |

Primary Examiner—Charles A. Ruehl
Attorney—Hofgren, Wegner, Allen, Stellman & McCord

[57] ABSTRACT

A flow meter for determining the rate of flow of fluid through a conduit and indicating the flow rate on a linear scale. A signal having a magnitude inversely proportional to the time elapsed for a substance carried by the fluid to travel a fixed distance is produced and converted into a flow rate indication.

20 Claims, 16 Drawing Figures

PATENTED JUN 19 1973 3,739,636

INVENTORS
ANTONIO A. VERSACI
PAUL ZUCCHINO

BY Hofgren, Wegner, Allen, Stellman & McCord
ATTORNEYS

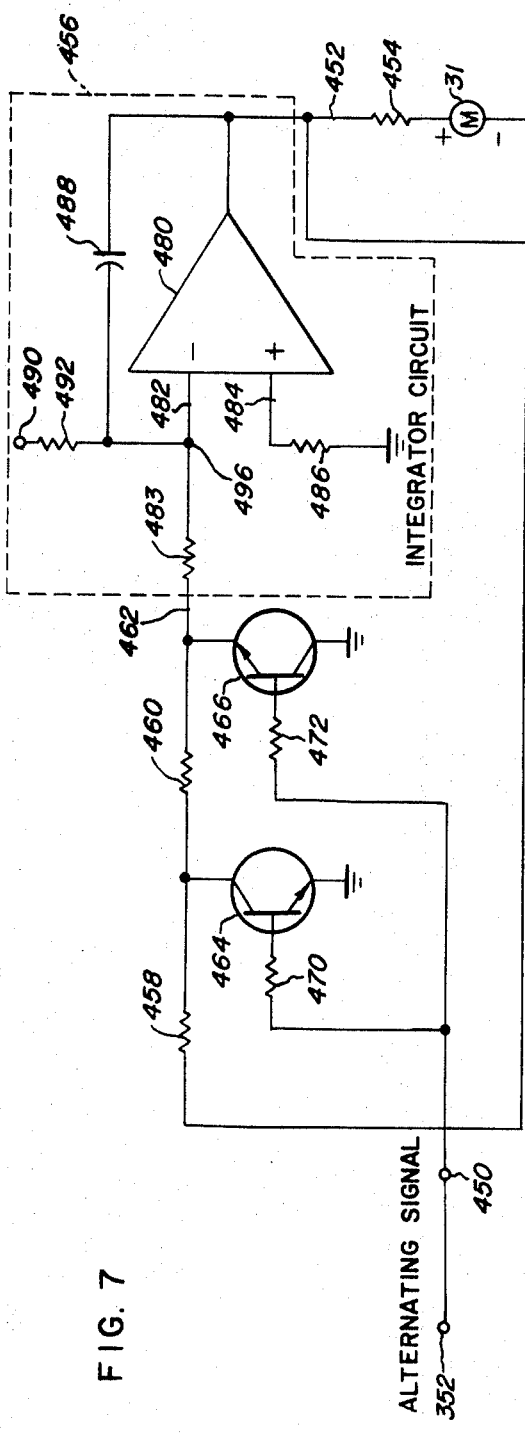
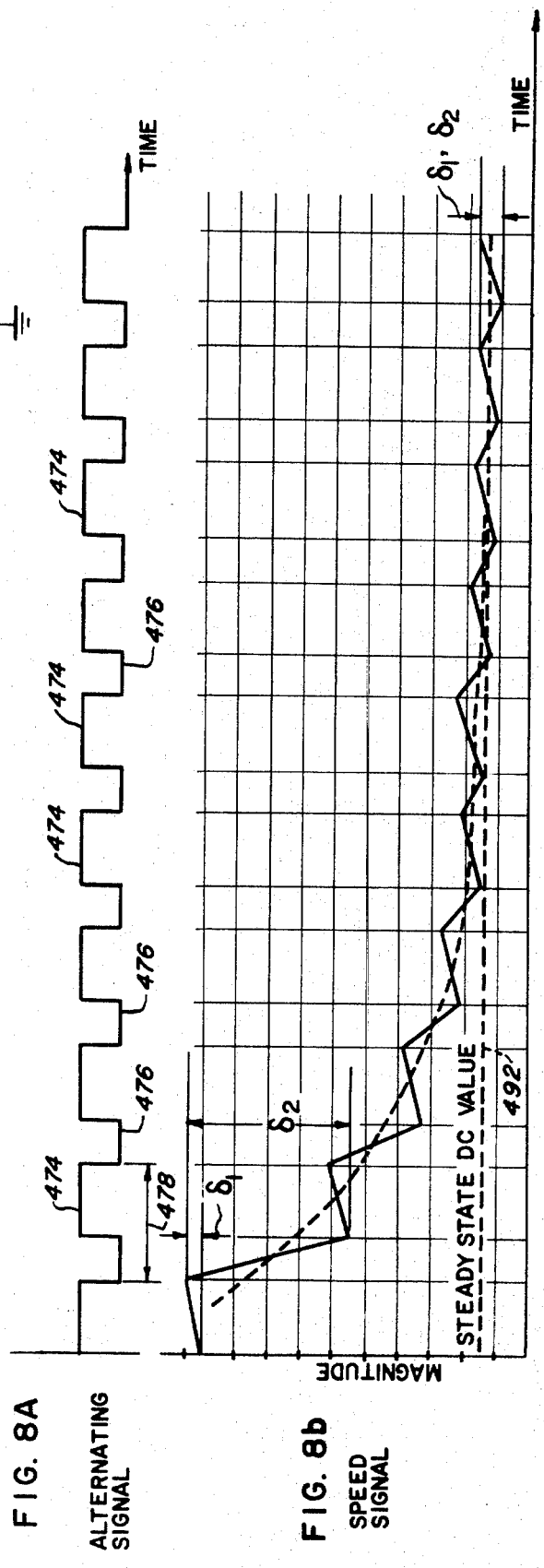
FIG. 7
FIG. 8A
FIG. 8b

LINEAR READOUT FLOWMETER

BACKGROUND OF THE INVENTION

1. Field of the Invention

This invention relates to a flow meter for determining the rate of flow of a liquid through a conduit, and more particularly to a flow meter capable of indicating flow rate in a linear fashion.

2. Description of the Prior Art

The rate of flow of liquid through a conduit is an important parameter which must be determined in many fluid flow applications. For example, many medical procedures require the flow of a liquid, such as blood, into the circulatory system of a patient. These procedures range in character from a simple transfusion or intravenous feeding to extracorporeal circulation in the utilization of an artificial heart or kidney. The rate of flow in these medical procedures is particularly critical, for an improper flow rate may cause irreparable damage to the patient.

It is known to introduce a detectable substance into a liquid flowing through a conduit, measuring the elapsed time for the substance to travel a fixed distance and then converting the elapsed time to a rate of flow indication. Flow rate, however, is not a linear function of elapsed time, but is inversely proportional to the elapsed time. Thus, an output display of elapsed time calibrated in flow rate has a nonlinear scale with crowded graduations of flow rate for short elapsed times. As stated, an accurate measurement of flow rate if often highly critical, and a nonlinear scale is undesirable as it is difficult to read.

SUMMARY OF THE INVENTION

The improved flow meter of the present invention overcomes the disadvantages of prior flow meters and, in particular, overcomes the disadvantages due to nonlinear flow rate indications in a novel manner. The flow meter of the present invention develops a signal having a magnitude directly proportional to the time elapsed for a detectable substance to travel a fixed distance, generates a pulsating signal having a duty cycle directly proportional to the magnitude of the elapsed time signal and, then, produces a speed signal having a magnitude inversely proportional to the duty cycle of the pulsating signal. The speed signal is linearly related to the speed of the substance and, thus, a flow rate indication is obtainable on a linear scale.

The elapsed time signal is obtained from a time measuring circuit by linearly charging a capacitor during the elapsed time. The capacitor stores the charge for a sufficient length of time for an operator to take a flow rate reading, and a circuit is provided to compensate for capacitor polarization and leakage losses so that the indication does not vary during the read period. At the end of the read period, the capacitor is automatically discharged and the circuitry is reset to make another measurement.

The storage by, and charging and discharging of, the capacitor respectively correspond to the read period, a timing period and a reset period, all of which are controlled by a timing and control logic circuit. Lamps coupled to the timing and control logic circuit indicate to the operator the status of the time measuring and control logic circuits during the various aforementioned periods.

Thus, an important feature of this invention is that the flow meter indicates flow rate on a linear scale.

Another feature of this invention is that the flow meter generates a signal having a magnitude inversely proportional to the elapsed time and, thus, directly proportional to the speed of the moving substance and the flow rate.

A further feature is that the flow meter has a circuit which compensates for polarization and leakage losses of a timing capacitor so that relatively inexpensive electrolytic capacitors can be utilized therefor.

Yet a further feature of the invention is that the flow meter stores a flow rate indication for a sufficiently long period of time for an operator to take a flow rate reading.

And another feature is that the flow meter is automatically set at the end of a read period to make a new elapsed time measurement.

Still a further feature is the provision of a circuit for generating an alternating signal having a duty cycle directly proportional to the elapsed time.

One more feature of the present invention is the provision of an improved flow meter having means for indicating that it is ready to make a new elapsed time measurement.

BRIEF DESCRIPTION OF THE DRAWINGS

Further features and advantages of the invention will be apparent from the following descriptions taken in connection with the accompanying drawings, wherein:

FIG. 7 is a circuit schematic of the linearizing computer and meter blocks of FIG. 2;

FIG. 8a is a representative waveform of the input signal to the circuit of FIG. 7; and FIG. 8b is an output signal of the circuit of FIG. 7 corresponding to the representative input signal of FIG. 8a.

DESCRIPTION OF THE INVENTION

For illustrative purposes, the invention will be described for use in the medical field, where contamination is a critical problem. However, the invention may be utilized in any liquid handling system where it is desired to determine the rate of flow of fluid through a conduit, or in fact may be utilized to determine the speed of any substance moving along a fixed path.

In medical applications it is common to use translucent or transparent glass or plastic tubing in the handling of blood or other liquids for administration to a patient. A bubble trap, of known configuration, is commonly employed to remove any bubbles from the fluid flow, as passage of a bubble into the blood stream of a patient may result in serious injury or death. The present invention takes advantage of these facts and injects a bubble into the conduit upstream from the bubble trap. The speed of the bubble is computed by determining the time elapsed for the bubble to travel a fixed distance, without requiring the introduction of additional apparatus into the flow stream. The bubble is carried by the fluid and, thus, travels at the same speed as the fluid which is directly proportional to the flow rate, the proportionate factor being the cross-sectional area of the conduit.

Figure 1:
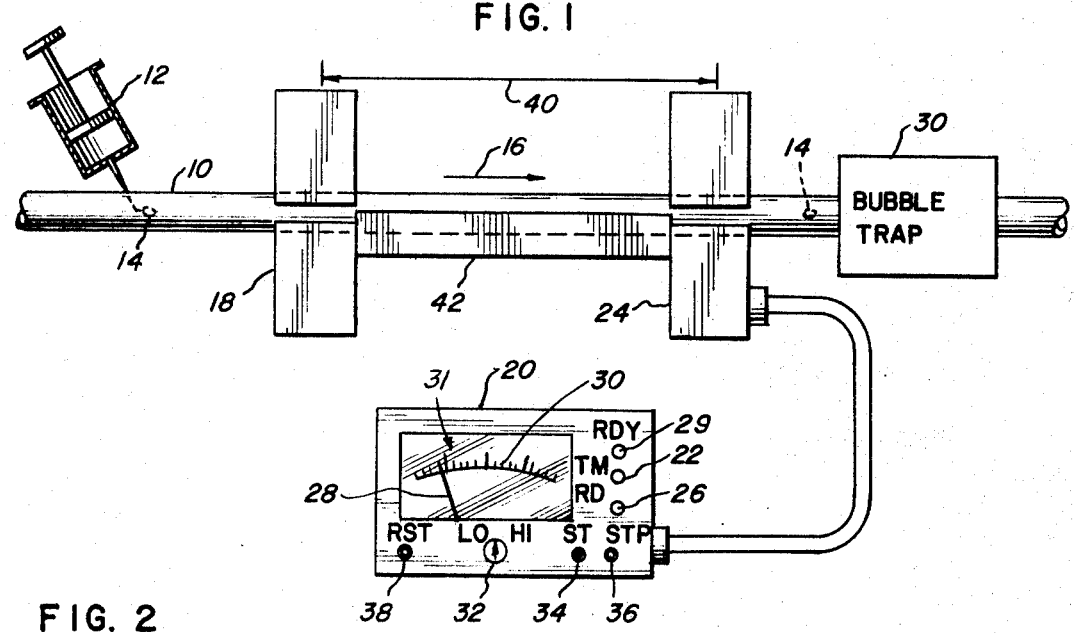
FIG. 1 is a pictorial view of an apparatus embodying the invention.

In FIG. 1 of the drawings, a section 10 of the conduit is shown which may be part of an extracorporeal circulatory system, or an infusion set, or the like. A bubble injector 12 introduces a bubble 14 into the fluid flow stream of conduit 10. The fluid flows from left to right as indicated by arrow 16. When the bubble passes a first detector 18, a time measuring circuit contained within the flow meter housing 20 begins to measure the passage of time, and a timing lamp 22 mounted to housing 20 lights up to indicate that an elapsed time measurement is being taken. When the bubble reaches a second detector 24, the time measuring circuit is deactivated, the elapsed time is stored, timing lamp 22 turns off, read lamp 26 turns on to indicate to the operator that a flow rate reading may be taken, and the flow rate is directly displayed by meter indicator 28 on linear scale 30 of the flow meter, generally designated by reference numeral 31. At the end of the read period, the flow meter circuitry is automatically reset, and when the flow meter is ready to make another elapsed time measurement, a ready lamp 29 turns on. A bubble trap 33, located downstream from second detector 24, removes bubble 14 from the fluid stream before it can enter the bloodstream of the patient.

In addition to the three status indicator lamps, four operator controls are mounted on the front of the flow meter housing 20 for easy access thereto. A scale selection switch 32 is provided to select high and low scales to accommodate fast and slow flow rates. Test start, push-button switch 34 and test stop, push-button switch 36 are provided to respectively simulate start and stop signals from detectors 18 and 24 so that the flow meter can be readily calibrated or tested. Finally, a reset, push-button switch 38 is provided to manually put the flow meter circuit in a condition ready to make an elapsed time measurement at any time during the read period or timing period.

Detectors 18 and 24 are of identical form and may each comprise a lamp and photocell combination. Such a detector is shown in U.S. Pat. No. 3,403,555 of Antonio A. Versaci et al., "Bubble Detector". For the purposes of the present invention, the following explanation is sufficient. A lamp and photoresistor are mounted on opposite sides of conduit 10 at each of detectors 18 and 24. With a continuous flow of liquid through conduit 10, a certain amount of light passes from each lamp to its corresponding photoresistor. The intensity of the light impinging the photoresistor and, thus, the electrical characteristics of the photoresistor depend upon the light transmitting characteristics of the liquid flowing in the conduit. Upon the passage of a bubble through the conduit, the light transmission characteristics are momentarily increased, resulting in an increase in the level of impinging light. The change in impinging light intensity causes a change in the resistance of the photoresistor, which is detected by the remaining flow meter circuitry to indicate the passage of a bubble thereby.

Detectors 18 and 24 are spaced apart a fixed distance 40 by a rigid semicircular trough 42, which is fixedly attached at each end to one of the detectors. The flexible conduit 10, which has a uniform cross-section, rests snugly against the rigid trough 42 and is clamped in place against the detectors. With this construction, the distance between the detectors is always constant since conduit 10 cannot sag or bend, and since the cross-sectional area is also constant, the liquid flows at a uniform speed between detectors 18 and 24.

Bubble injector 12 introduces a gas, such as air, into the liquid, thereby creating bubble 14. Although injector 12 is illustrated in the form of a hypodermic needle, any other means such as a three-way stop cock or the like may be utilized. While the introduction of a gas into the liquid has been illustrated, the invention is also applicable for use with other substances which are immiscible with the liquid and, thus, are detectable. Furthermore, while the use of bubble trap 33 has been described, in many nonmedical applications the introduction of a bubble into a liquid flow stream produces no deleterious results, and in such applications, bubble trap 33 may be eliminated.

Figure 2:
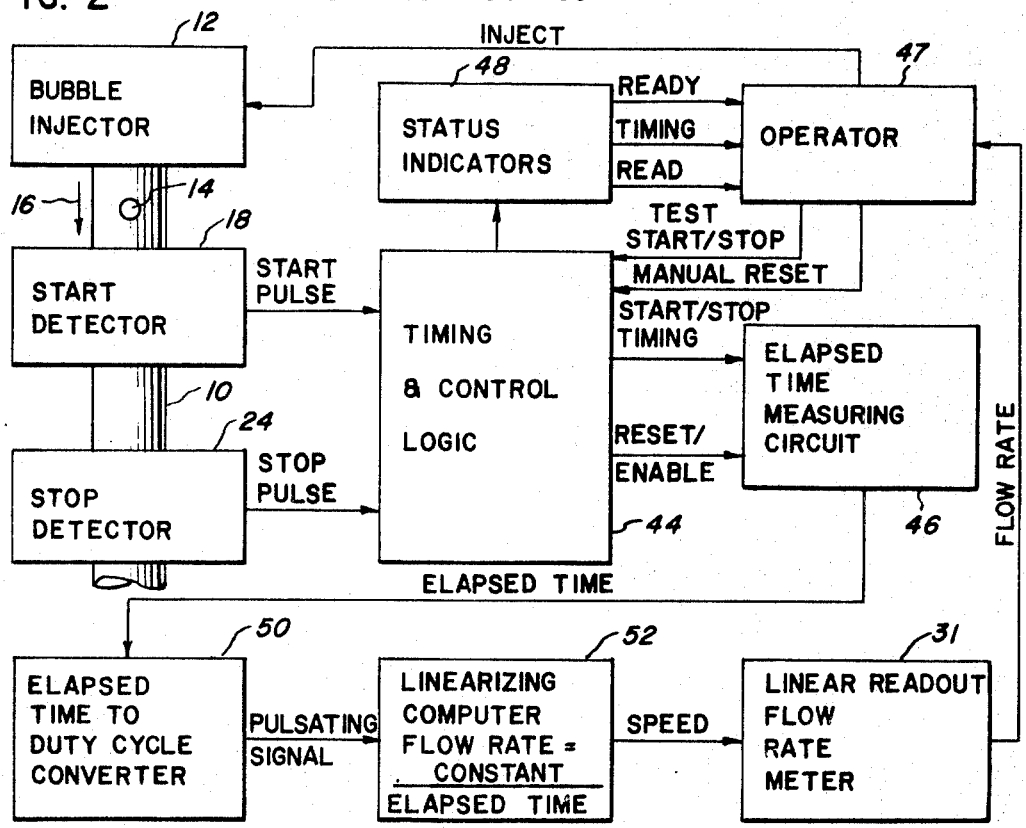
FIG. 2 is a block diagram showing the interrelations between various circuits of a preferred embodiment of the flow meter.

Referring now to FIG. 2, a block diagram of a preferred embodiment of the flow meter is shown. Bubble injector 12 injects bubble 14 into the fluid flowing through conduit 10. Upon bubble 14 reaching start detector 18, a start pulse is generated and coupled to timing and control logic circuit 44. Control logic circuit 44 in response to the start pulse generates an enable signal and a start timing signal to time measuring circuit 46 and generates a timing signal to the status indicators 48, lamps 22, 26 and 29, to indicate that an elapsed time measurement is in process. When bubble 14 reaches stop detector 24, a stop pulse is generated and coupled to control logic circuit 44, which generates a stop timing signal to time measuring circuit 46 and a read signal to status indicators 48 in response thereto. The time measuring circuit 46 generates a signal representing the elapsed time to elapsed time to duty cycle converter circuit 50 until timing and control logic circuit 44 removes the enable signal and applies a reset signal at the end of the read period. Converter circuit 50 generates a pulsating signal having a duty cycle directly proportional to the elapsed time signal from timing circuit 46. This pulsating signal is coupled to linearizing computer circuit 52 which computes and generates a speed signal equal to a constant divided by the elapsed time. The speed signal is directly proportional to the speed and flow rate and is coupled to the linear readout flow rate meter 31 which converts the speed signal into a linear indication of flow rate. The flow rate indication is then read by the operator 47 during the read period. At the end of the read period, timing and control logic circuit 44 generates a reset signal to time measuring circuit 46 and when time measuring circuit 46 is ready for a new measurement, a ready signal is coupled to status indicator 48 to indicate to the operator that a new elapsed time measurement may be taken. The operator may then manually actuate the bubble injector 12 to inject a new bubble into the conduit 10.

It should be noted that although the operator manually actuates the bubble injector and records the flow rate indication, both functions could be performed automatically. For example, the ready signal coupled to status indicator 48 could be used to control an automatic bubble injector, and the speed signal 52 could be coupled to a chart or tape recorder for automatically recording the flow rate.

Figure 3:
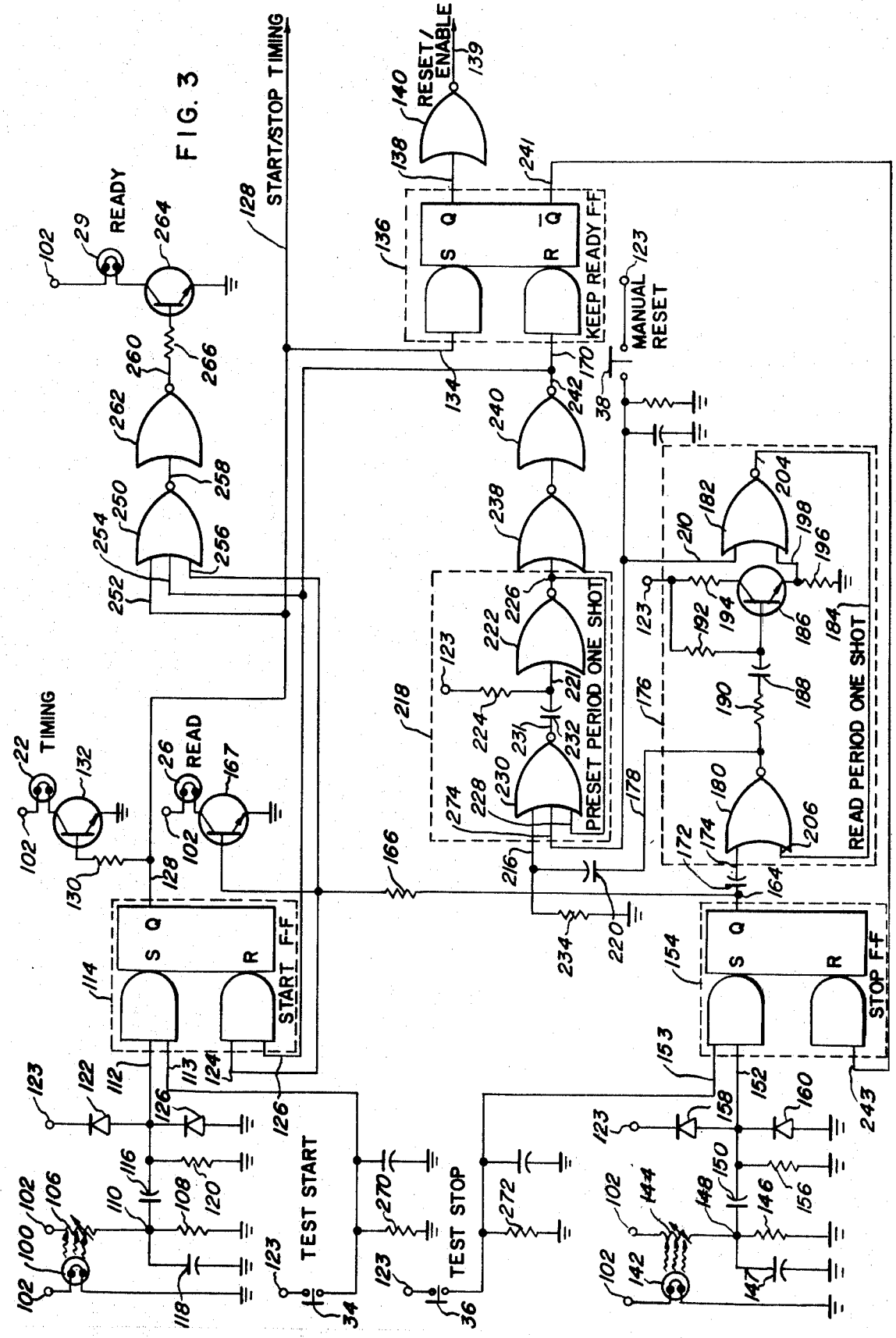
FIG. 3 is a circuit schematic of the timing and control logic circuit block of FIG. 2.

Start detector 18, stop detector 24 and control logic circuit 44, previously shown in block form in FIG. 2, are shown in schematic form in FIG. 3. Start detector 18 comprises a start lamp 100 coupled between a first DC supply voltage 102 from a power supply (not shown) and a reference potential such as ground, and a start photoresistor 106 coupled from supply voltage 102 through resistor 108 to ground. Normally the light from start lamp 100 is partially absorbed by and partially transmitted through the fluid in conduit 10 to impinge start photoresistor 106. Most of the light, however, is absorbed by the fluid, and the resistance value of photoresistor 106 has a high value with respect to the resistance value of resistor 108 and, thus, the voltage at junction 110 between resistor 106 and 108 is close to ground potential. However, when bubble 14 passes between lamp 100 and start photoresistor 106, most of the light impinges start photoresistor 106 and its resistance value substantially decreases in response thereto. This decrease in the resistance value of start photoresistor 106 causes a rapid increase in potential at junction 110 which is coupled to set input 112 of a bistable multivibrator, start flip-flop 114, as a positive pulse through capacitor 116. Capacitor 118 coupling junction 110 to ground potential functions as a noise filter and resistor 120 coupled from set input 112 to ground potential provides a discharge path for capacitor 116. Set input 112 is protected from excessive positive voltages by diode 122 coupled from set input 112 to a second supply voltage 123 and is protected from excessive negative voltages by diode 126 coupled from set input 112 to ground potential.

Figure 4:
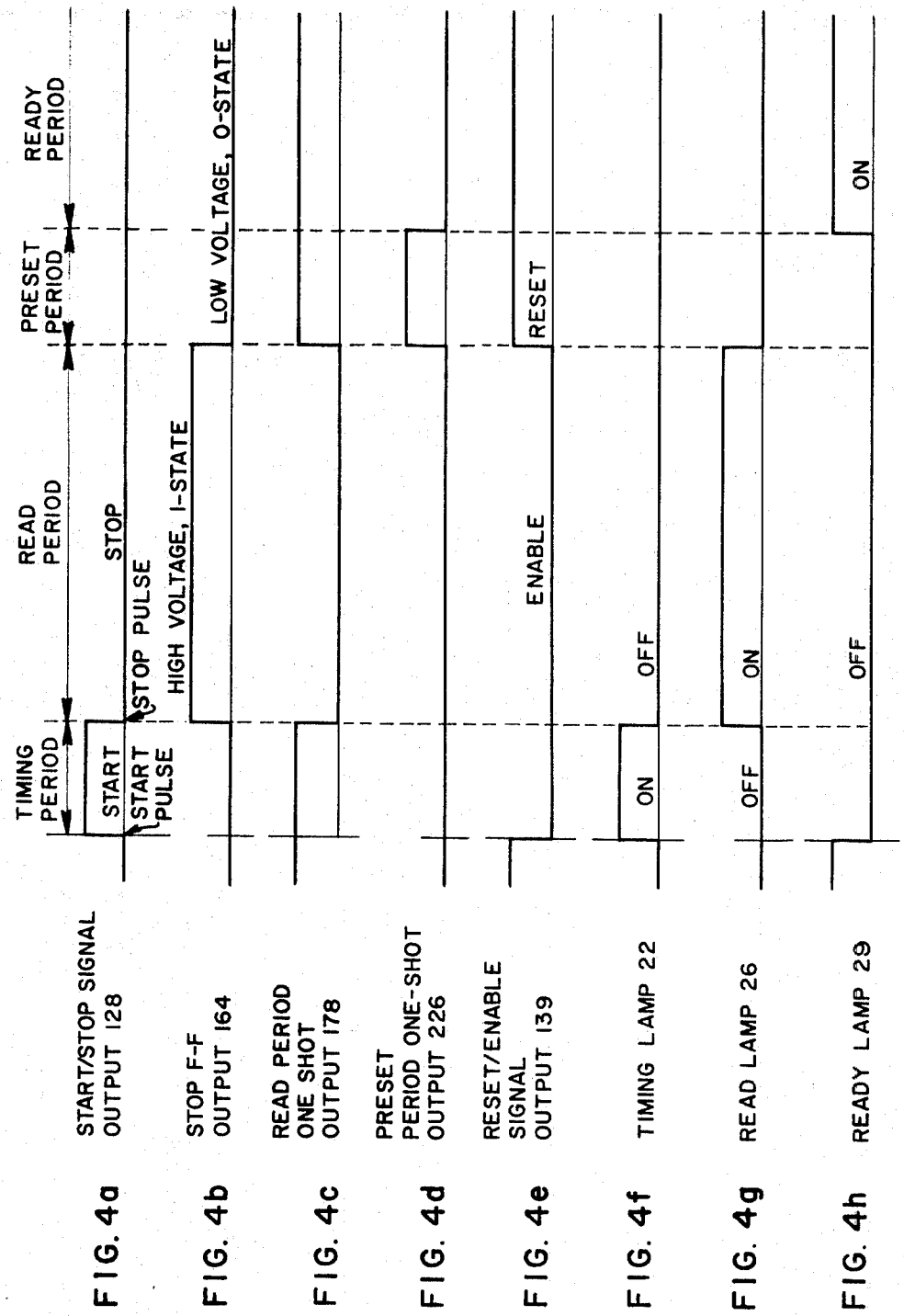
FIGS. 4a–h are comparative waveforms of various outputs of the timing and control logic circuit of FIG. 3.

RS flip-flop 114 is a bistable multivibrator having two set inputs 112 and 113, two reset inputs 124 and 126 and a normal output 128. The output 128 assumes a 1-state (a high voltage level with respect to ground potential) in response to a positive pulse at either of the set inputs and assumes a 0-state (ground potential) in response to a positive pulse at either of the reset inputs. Thus, when the positive start pulse is coupled through capacitor 116 to input 112, output 128 assumes a 1-state as shown in FIG. 4a. The 1-state of output 128 represents the start portion of the start/stop timing signal coupled to time measuring circuit 46 shown in FIG. 2. As soon as output 128 assumes the 1-state, time measuring circuit 46 starts measuring elapsed time which will be explained hereinafter. Resistor 130 couples the start signal on output 128 to the base of transistor 132 which turns on in response thereto. Timing lamp 22 is coupled between supply voltage 102 and the collector of transistor 132 and lights in response to transistor 132 turning on as shown in FIG. 4f to indicate that an elapsed time measurement is being taken as previously explained.

The high voltage start signal from output 128 is also coupled to set input 134 of keep ready flip-flop 136 which turns on in response thereto (i.e., normal output 138 assumes a high voltage, 1-state). Output 138 is coupled to NOR gate 140 which inverts the output signal on 138 to a low voltage, 0-state enable signal on output 139 as shown in FIG. 4e. This enable signal is coupled to timing circuit 46 and enables it to function in response to the start/stop timing signal which will be explained hereinafter.

Stop detector 24 comprises stop lamp 142 coupled between voltage source 102 and ground and photoresistor 144 coupled from voltage supply 102 through resistor 146 to ground and operates identically to start detector 18. Again, capacitor 147, coupled between junction 148 and ground, functions as a noise filter. When bubble 14 passes between stop lamp 142 and stop photoresistor 144, the amount of light impinging photoresistor 144 increases and the voltage at junction 148 rises in response thereto. The voltage rise at junction 148 is differentiated by capacitor 150 and appears as a positive pulse at input 152 of stop flip-flop 154. Resistor 156 coupled from set input 152 to ground provides a discharge path for capacitor 150, and diodes 158 and 160 protect input 152 from excessive voltages.

Stop flip-flop 154 operates in an identical manner as start flip-flop 114. When a positive pulse is coupled to set input 152, normal output 164 assumes a high voltage, 1-state. The signal on output 164 shown in FIG. 4b is coupled through resistor 166 to reset input 124 of start flip-flop 114, and when reset input 124 goes high the start/stop timing signal on normal output 128 assumes a low voltage, 0-state to indicate the end of the timing period. The end of the timing period coincides with the beginning of the read period and, thus, transistor 167, having its base coupled to the stop signal on output 164 of stop flip-flop 154, turns on in response thereto to light read lamp 26 as shown in FIG. 4g. Similarly, transistor 132 turns off in response to output 128 switching to the low voltage, 0-state, and timing lamp 22 is turned off thereby. The low voltage, 0-state on output 128 comprises the stop portion of the start/stop timing timing signal shown in FIG. 4a and controls the time measuring circuit 46, which will be explained hereinafter. Set input 134 of keep ready flip-flop 136 is also coupled to output 128 and assumes a low voltage, 0-state which enables keep ready flip-flop 136 to be subsequently reset by a positive pulse coupled to reset input 170 at the end of the read period.

This 1-state stop pulse from output 164 of stop flip-flop 154 is differentiated by capacitor 172 and appears as a positive pulse to input 174 of read period monostable multivibrator (one shot) shot) 176. Output 178 of read period one shot 176, being normally in a high voltage, 1-state, assumes a low voltage, 0-state in response to the positive pulse coupled to junction 174 at the beginning of the read period and maintains this low voltage, 0-state for a preselected read period as shown in FIG. 4c. At the end of the read period, output 178 automatically reverts to the high voltage, 1-state.

Read period one shot 176 comprises NOR gates 180 and 182 coupled in a forward direction through a time delay circuit and feedback coupled in the reverse direction through lead 184. The time delay circuit comprises an NPN transistor 186 having its base coupled through capacitor 188 and resistor 190 to output 178 and coupled to supply voltage 123 through base bias resistor 192. The collector of transistor 186 is coupled through load resistor 194 to supply voltage 123, and the emitter is coupled through resistor 196 to ground and coupled to input 198 of NOR gate 182.

In the stable state base bias current is applied through resistor 192, transistor 186 is saturated and input 198 is in a high voltage, 1-state. A NOR gate is a digital logic circuit gate in which the output assumes a high voltage, 1-state only when all of the inputs are in a low voltage, 0-state and, conversely, assumes a low voltage, 0-state in response to any of the inputs assuming a high voltage, 1-state. Thus, during the stable condition with input 198 in a high voltage, 1-state, output 204 of NOR gate 182 and input 206 of NOR gate 180 are both in a low voltage, 0-state. Capacitor 172 blocks any long duration DC voltages to input 174 to keep it in a low voltage, 0-state, and, therefore, output 178 of NOR gate 180, the output of read period one shot 176, is normally in a high voltage, 1-state.

When a positive pulse is coupled through capacitor 172 to input 174, in response to the bubble reaching stop detector 24, output 178 switches to a low voltage, 0-state. This negative pulse is coupled through capacitor 188 to turn off transistor 186. When transistor 186 turns off, input 198 is coupled to ground through resistor 196, and output 204 of NOR gate 182 and input 206 of NOR gate 180 will assume a high voltage, 1-state. Input 206 to NOR gate 180 keeps output 178 in a low voltage, 0-state after capacitor 172 has been charged and input 174 has returned to the low voltage, 0-state. As soon as output 178 switches to the low voltage, 0-state, current from supply voltage 123 charges capacitor 188 through resistor 192. At the end of the read period, capacitor 188 has been sufficiently charged to turn transistor 186 back on and, thus, ready period one shot 176 reverts to the stable state with output 178 in the high voltage, 1-state.

The output 178 of read period one shot 176 is coupled to input 216 of preset period one shot 218 through capacitor 220. Preset period one shot 218 operates in a similar manner to read period one shot 176. In the stable state input 221 of NOR gate 222, coupled to supply voltage 123 through resistor 224, is in the high voltage, 1-state and, thus, output 226 of NOR gate 222, the output of preset period one shot 218, coupled to input 228 of NOR gate 230 is in the low voltage, 0-state. When output 178 switches to the 1-state at the end of the read period, a positive pulse appears at input 216, and output 231 of NOR gate 230 assumes a low voltage, 0-state in response thereto. A negative pulse is coupled to input 221 through capacitor 232 in response to output 231 switching to the 0-state, and output 226 of NOR gate 222 and input 228 of NOR gate 230 each assumes a 1-state in response thereto. Capacitor 220 subsequently charges through resistor 234 and input 216 reverts to the low voltage, 0-state, but input 228, the other input to NOR gate 230, keeps output 231 in the low voltage, 0-state. As soon as output 231 switches to the low voltage, 0-state, current from supply voltage 123 starts charging capacitor 232 through resistor 224. When the charge across capacitor 232 reaches a value corresponding to the 1-state at the end of the preset period, preset period one shot reverts to the stable state with output 226 in the low voltage, 0-state. Output 226 of preset period one shot 218 is coupled to NOR gate 238. NOR gate 238 inverts its input and is coupled to NOR gate 240 which again inverts the once inverted preset signal from NOR gate 238. Thus, output 226 is inverted twice, and output 242 of NOR gate 240 is identical to output 226 of preset period one shot 218 as shown in FIG. 4d.

Output 242 is coupled to reset input 170 of ready flip-flop 136 and to reset input 126 of start flip-flop 114. Thus, at the end of the ready period, which coincides with the beginning of the preset period, input 170 assumes a high voltage, 1-state and inverting output 241 of ready flip-flop 136 coupled to reset input 243 of stop flip-flop 154 switches to a high voltage, 1-state which resets stop flip-flop 154. The resetting of stop flip-flop 154 enables start flip-flop 114 which in turn is reset by the preset signal from output 242. Normal output 138 of keep ready flip-flop 136 assumes a low voltage, 0-state in response to reset input 170 switching to the high voltage, 1-state. This low voltage, 0-state is inverted by NOR gate 140 and, thus, output 139 switches to a high voltage, 1-state until the next start timing signal voltage. The 1-state of output 139 represents the reset portion and the 0-state represents the enable portion of the reset/enable signal coupled to time measuring circuit 46.

NOR gate 250 decodes a ready condition to activate ready lamp 29. Input 252 is coupled to normal output 128 of start flip-flop 114; input 254 is coupled to output 242 of NOR gate 240, and input 256 is coupled to normal output 164 of stop flip-flop 154 through resistor 166. At the end of the preset period all of the inputs of NOR gate 250 are in the low voltage, 0-state, and output 258 switches to the high voltage, 1-state which appears as a low voltage, 0-state at output 260 after being inverted by NOR gate 262. Output 260 is coupled to the base of transistor 264 through resistor 266, and when output 260 switches to the low voltage, 0-state, transistor 264 turns on in response thereto and conducts current from supply voltage 102 through ready lamp 29 to ground which lights to give a ready indication as shown in FIG. 4h. Inputs 252, 254 and 256 are respectively in the high voltage, 1-state during the timing period, the preset period and the read period and, thus, ready lamp 29 is kept off during each of these periods.

Further features of the timing control logic circuit are test start push button switch 34 and test stop push button switch 36. Test start push button switch 34 and test stop push button switch 36 are respectively coupled from supply voltage 123 to set input 113 of start flip-flop 114 and set input 153 of stop flip-flop 154 to simulate start and stop pulses thereto. Resistors 270 and 272 respectively maintain a low voltage, 0-state at inputs 113 and 153 when the test buttons are not closed and, thus, enable their corresponding flip-flops to operate in a normal fashion when not being tested.

Another feature of the circuit is manual reset push button switch 38. This switch when closed couples supply voltage 123 to input 274 of NOR gate 230 and input 210 of NOR gate 182. Closure of reset switch 123 immediately resets preset period one shot 218, start flip-flop 119, stop flip-flop 154, and ready flip-flop 136 to a condition of the control circuit corresponding to the end of the preset period and, therefore, a new elapsed time measurement may be taken without waiting until the end of the timing, read or preset periods.

Thus, in summary, timing and control logic 44 has two outputs coupled to time measuring circuit 46, outputs 128 and 139. The signal carried by output 128 comprises the start/stop timing signal. Output 128 assumes a high voltage, 1-state in response to bubble 14 reaching start detector 18 to indicate a start signal and assumes a low voltage, 0-state in response to bubble 14 reaching stop detector 24 to indicate a stop signal. Output 139 carries the reset/enable signal. It assumes a low voltage, 0-state in response to bubble 14 reaching start detector 18 to enable time measuring circuit 46 and assumes a high voltage, 1-state in response to the read period ending to reset time measuring circuit 46 to make another timing measurement. In addition, three lamps, timing lamp 22, read lamp 26 and ready lamp 29, light during the corresponding periods of the time measuring circuit to indicate the circuit status to the operator. The time measuring circuit 46 requires a preselected reset time period after the reset signal before it is ready to make a new measurement and, thus, preset period one shot 218 is provided to keep ready lamp 29 off until the end of the preset period.

Figure 5:
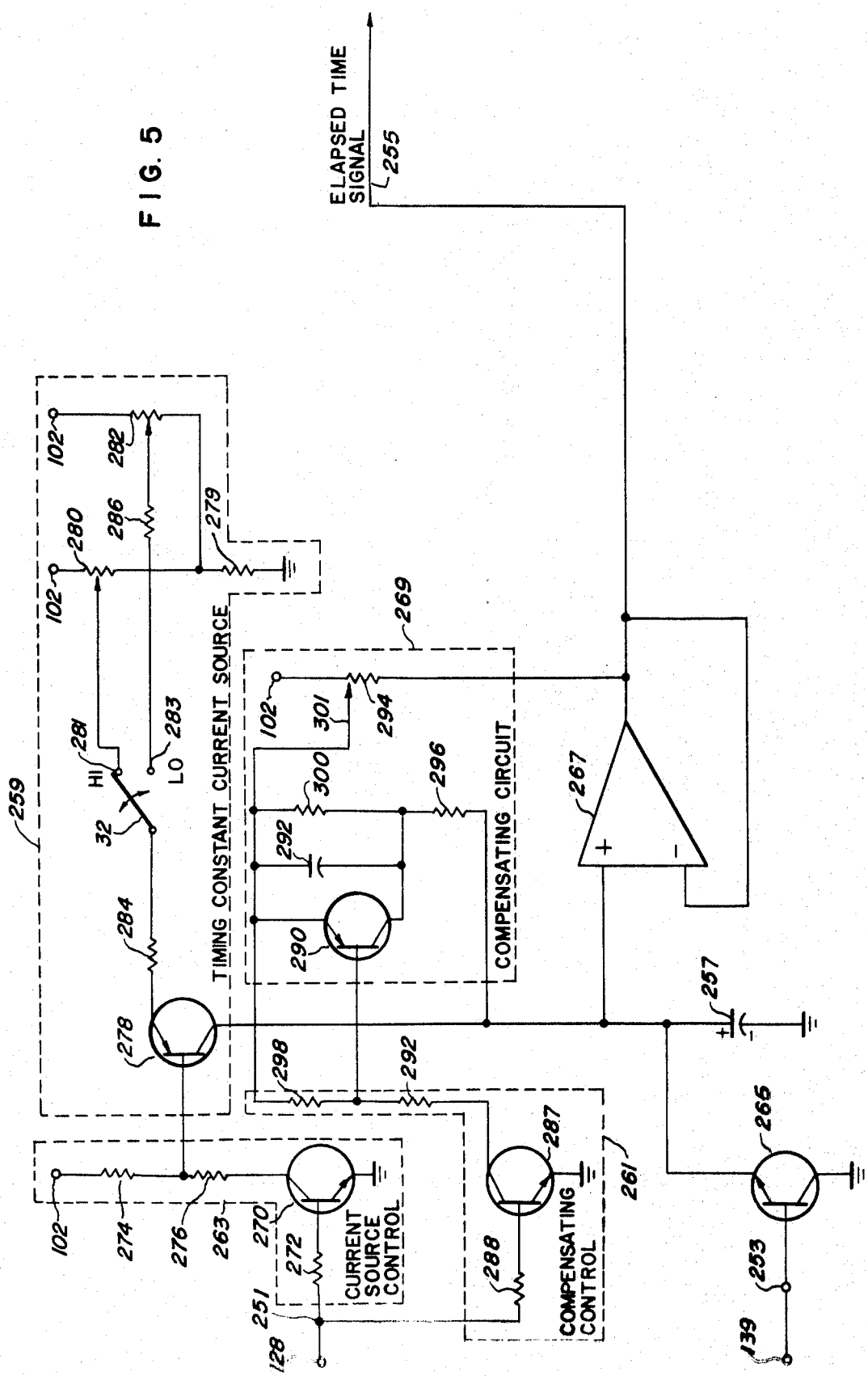
FIG. 5 is a circuit schematic of the time measuring circuit block of FIG. 2.

Referring now to FIG. 5, the time measuring circuit 46 previously shown in block form in FIG. 2 is shown in schematic form. Output 128 from control circuit 44 of FIG. 3 carrying the start/stop timing signal is coupled to junction 251 and output 139 carrying the reset/enable signal from control circuit 44 of FIG. 3 is coupled to junction 253. The time measuring circuit produces a signal on output 255 having a magnitude directly proportional to the elapsed time which is coupled to converter circuit 50. Time measuring circuit 46 comprises a timing capacitor 257, a timing constant current source circuit 259 for charging timing capacitor 257 during the interval between the start and stop signals, current source control circuit 263 for controlling the timing constant current source in response to the start/stop signals, compensating circuit 269 for maintaining the voltage across timing capacitor 257 at a constant value during the read period, compensating control circuit 261 for controlling the compensating circuit, switching transistor 265 for keeping capacitor 257 discharged prior to the start signal, and a differential amplifier 267 for interfacing the elapsed time signal across timing capacitor 257 with converter circuit 50.

Switching transistor 265 is used in the inverted mode, having its emitter coupled to the positive side of capacitor 257 and its collector coupled to ground, the negative side of capacitor 257. When a reset signal, a high voltage, 1-state, is received at junction 253, transistor 265 turns on and reduces the voltage across timing capacitor 257 to a few millivolts. Transistor 265, upon turning on, is capable of discharging the maximum possible charge across timing capacitor 257 within the preset period, and, thus, once the ready lamp turns on, the operator can be assured that timing capacitor 257 is fully discharged and the time measuring circuit is ready to make an elapsed time measurement. Transistor 265 turns off in response to the enable signal, a low voltage, 0-state, coupled to junction 253 from control circuit 46 which occurs simultaneously with the start signal and remains off to allow timing capacitor 257 to store charge until the preset signal is received.

When the start signal is received at junction 251, it is coupled through resistor 272 to the base of transistor 270 which turns on in response thereto. The collector of transistor 270 is coupled to supply voltage 102 through resistors 274 and 276. The junction between resistors 274 and 276 is coupled to the base of transistor 278 of constant current source 259 to control the charging current to capacitor 257. When transistor 270 turns on, ground potential is coupled through transistor 270 and resistor 276 to the base of transistor 278 which turns on in response thereto to charge timing capacitor 257. At the end of the timing period, junction 251 assumes the 0-state, stop signal and transistor 270 turns off in response thereto. When transistor 270 turns off, transistor 278, the is coupled to supply voltage 102 through resistor 274, turns off in response thereto to uncouple the current source from timing capacitor 257.

Current for charging timing capacitor 256 can be taken from either of two potentiometer circuits coupled between supply voltage 102 and ground through resistor 279. One potentiometer resistor 280 is coupled between supply voltage 102 and resistor 279, and the other potentiometer resistor 282 is coupled across resistor 280. When scale selection switch 32 is in the high position 281, charging current flows through potentiometer resistor 280, switch 32, resistor 284 and transistor 278 to charge capacitor 257 with the charging time set by the resistance values of these resistors. When scale selection switch 32 is in the low position 283, and additional resistor 286 having a high resistance value with respect to resistor 280 is coupled between supply voltage 102 and timing capacitor 257 to increase the charging time to keep the elapsed time signal across timing capacitor 257 linear for relatively longer elapsed time periods corresponding to low flow rates.

The base of transistor 287 of compensating control circuit 261 is also coupled to junction 251 through resistor 288. Transistor 287 is turned on during the start portion and turned off during the stop portion of the start/stop signal. When transistor 287 is on, the base of transistor 290 of compensating circuit 262 is coupled through resistor 292 and transistor 287 to ground and transistor 290 turns on. Transistor 290 remains on during the timing period to conduct a small portion of the charging current from supply voltage 102 through a third potentiometer resistor 294 and resistor 296 to timing capacitor 257. Also, compensating capacitor 292 is kept discharged when transistor 292 is on.

When an electrolytic capacitor, such as timing capacitor 257, is placed in an electric field, there is a slight displacement of positive atoms in the dielectric which donates to the apparent charge across the capacitor. However, when the electric field is removed, such as when the timing period ends and transistor 278 turns off, the positive atoms realign themselves in their normal state and there is a droop in the charge across the capacitor. This polarization loss is most pronounced during the first few seconds after the field is removed, i.e., the first few seconds into the read period.

At the end of the timing period, transistor 287 turns off which removes ground potential from the base of transistor 290 and allow base current from supply voltage 102 through potentiometer resistor 294 and resistor 298 to be applied thereto. Transistor 290 turns off in response to ground being removed from its base and ceases to conduct charging current to capacitor 257. However, since capacitor 292 had previously been kept discharged, the small portion of charging current previously supplied through transistor 290 is temporarily replaced by an initial current through compensating capacitor 292 and resistor 296 to compensate for the polarization losses thereof when transistor 290 first turns off. After a few seconds, the droop due to polarization loss is less pronounced, compensating capacitor 292 charges and the polarization loss, compensating current is removed, and long term leakage compensation current is supplied from supply voltage 102 through potentiometer resistor 294, resistor 300 and resistor 296 to timing capacitor 257.

Potentiometer resistor 294 maintains the long term leakage compensation current at a constant value. One end of resistor 294 is coupled to the output of differential amplifier 267, which is at the potential of timing capacitor 257, and wiper arm 301 is placed at a few volts above the voltage across capacitor 257. This assures that the leakage current compensation is essentially constant. Wiper arm 301 is adjusted for minimum drift during the readout period after a simulated high flow rate when the effects of droop and leakage are most pronounced. This circuit without additional trimming is capable of limiting drift over a ten second read period to plus or minus one percent maximum.

Differential amplifier 267 provides an interface between capacitor 257 and converter circuit 50 and is connected as a voltage follower to present an extremely high input impedance to the elapsed time voltage across timing capacitor 257. Amplifier 267 produces a voltage on output 255 which is directly proportional to the elapsed time voltage across capacitor 257. This elapsed time signal is coupled to the elapsed time to duty cycle converter circuit 50 as shown in FIG. 2.

Figure 6:
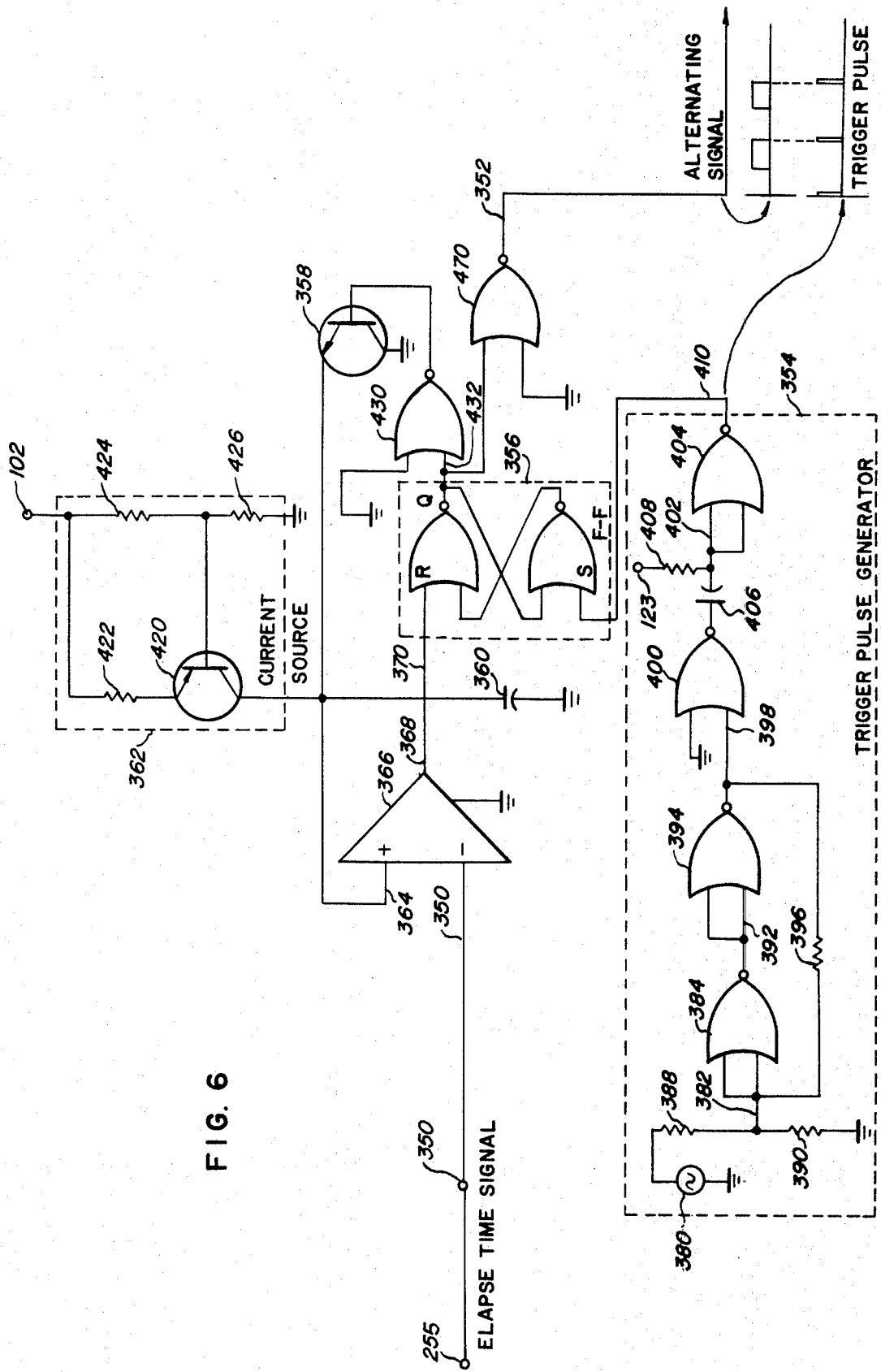
FIG. 6 is a circuit schematic of the elapsed time to duty cycle converter block of FIG. 2.

Referring now to FIG. 6, the elapsed time to duty cycle converter circuit 50, shown in block form in FIG. 2, is shown in schematic form. The elapsed time signal on output 255 of the timing circuit shown in FIG. 5 is coupled to the input 350 of the converter circuit of FIG. 6 for the duration of the read period. During this read period, the converter circuit generates a pulsating digital signal having a duty cycle directly proportional to the magnitude of the elapsed time signal. The duty cycle for the purpose of this specification will be defined as the percentage of time that the pulsating or alternating signal on output 352 is in the low voltage, 0-state during each period of the alternating signal.

Circuit 354 generates a trigger pulse at a preselected frequency, such as 60 pulses per second, power line frequency, which is coupled to RS flip-flop 356. Each trigger pulse sets RS flip-flop 356 which turns off transistor 358 to allow capacitor 360 to charge from constant current source 362. Capacitor 360 is coupled to normal input 364 of differential amplifier 366 and the elapsed time signal is coupled to inverting input 350 of differential amplifier 366, the input of converter circuit 50. Output 368 of differential amplifier 366 is coupled to reset input 370 of RS flip-flop 356 and the output signal on output 368 has a magnitude directly proportional to the arithmetic difference between the magnitudes of the signals at inputs 364 and 350. A certain period of time after RS flip-flop 356 is set, depending upon the magnitude of the elapsed time signal at input 350, the charge across capacitor 360 coupled to input 364 exceeds the magnitude of the elapsed time signal by a preselected amount, output 368 reaches a voltage corresponding to the 1-state and RS flip-flop 356 is reset until the next trigger pulse is generated. Thus, the amount of time that RS flip-flop 356 is in the set condition is directly proportional to the magnitude of the elapsed time signal, and since the trigger signal is generated at a fixed frequency, the duty cycle of the pulsating signal on output 352 is also directly proportional to the magnitude of the elapsed time signal.

Trigger signal generator 354 has a fixed frequency, signal reference source 380 which may be taken from a standard AC power line through a transformer, but could also constitute an oscillator circuit if AC power is not available. This signal is coupled to input 382 of NOR gate 384 through a voltage divider circuit consisting of resistors 388 and 390. The output of NOR gate 384 is coupled to input 392 of NOR gate 394, and the output of NOR gate 394 is coupled back to input 382 of NOR gate 384 through resistor 396. NOR gates 384 and 394 coupled in this fashion constitute a Schmitt trigger circuit and generate a square wave at the frequency of reference source 380. This square wave signal is coupled to input 398 of NOR gate 400 which inverts the square wave signal and provides a buffered output for the Schmitt trigger circuit. The inverted square wave signal from NOR gate 400 is AC coupled to input 402 of NOR gate 404 through capacitor 406 which, in turn, is coupled to supply voltage 123 through resistor 408.

Output 410 of NOR gate 404 is normally in a low voltage 0-state since input 402 is DC coupled to voltage supply 123. When, however, the output of NOR gate 400 switches from a high voltage, 1-state to a low voltage, 0-state, a negative pulse is transmitted to input 402 through capacitor 406 and output 410 assumes a high voltage, 1-state in response thereto. Capacitor 406 charges through resistor 408 until the voltage at input 402 again corresponds to a 1-state and output 410 switches back to a low voltage, 0-state. Thus, the pulse width at output 410 depends upon the RC time constant of resistor 408 and capacitor 406. A ten microsecond pulse width has been found suitable for operation at a frequency of 60 pulses per second.

Current source 362 comprises a transistor 420 having its emitter coupled to supply voltage 102 through resistor 422 and its collector coupled to ground through capacitor 360. Base bias current is supplied through resistors 424 and 426 to continuously keep transistor 420 in a conductive state.

As stated, transistor 358 controls the charging and discharging of capacitor 360. Transistor 358 shorts the current from current source transistor 420 to ground when in a conductive state and allows capacitor 360 to charge when in cut off. Transistor 358 in turn is controlled by the output of NOR gate 430 which is coupled to and inverts the signal from normal output 432 of flip-flop 356. Thus, each time a trigger pulse from output 432 assumes a high voltage, 1-state, the output of NOR gate 430 switches to a 0-state and transistor 358 turns off. When capacitor 360 exceeds a preselected value above the magnitude of the elapsed time signal at inverting input 350 of differential amplifier 366, a high voltage, 1-state pulse appears at reset input 370 to reset flip-flop 356. Upon flip-flop 356 being reset, normal output 432 switches to a 0-state, the output of NOR gate 430 switches to a 1-state, and transistor 358 turns on to short out the charging current to capacitor 360. Normal output 432 is coupled to NOR gate 470 which inverts the signal and generates the pulsating signal on output 352. Comparative waveforms of the trigger signal generated on output 410 and the pulsating signal on output 352 are shown in the lower right hand corner of FIG. 6.

This pulsating signal on output 352, having a duty cycle directly proportional to the elapsed time, is coupled to input 450 of the linearizing computer circuit shown in FIG. 7, previously shown in block form in FIG. 2. The computing circuit shown in FIG. 7 generates a speed signal on output 452 having an average magnitude inversely proportional to the duty cycle of the pulsating signal applied to input 450. This speed signal is coupled to a linear readout flow rate meter 31, such as a DC ammeter, through resistor 454.

The computing circuit comprises an integrator circuit 456, series resistors 458 and 460 for coupling the output of integrator circuit 456 to input 462 of integrator circuit 456, and transistors 464 and 466 for shorting input 462 to a reference potential, such as ground, during the low voltage, 0-state of the alternating signal at input 450.

Both transistors 464 and 466 turn on during the high voltage, 1-state 474 of the pulsating signal shown in FIG. 8a to short integrator input circuit 462 to ground, and both transistors 464 and 466 turn off during the low voltage, 0-state 476 of the alternating signal, shown in FIG. 8a, thus allowing the speed signal on integrator circuit output 452 to be coupled through resistors 458 and 460 to integrator circuit input 462. Transistor 464 is operated in the forward, high current gain mode, having its collector coupled to the junction between resistors 458 and 460, the emitter coupled to ground and its base coupled to computing circuit input 450 through resistor 470, and is capable of shorting the maximum possible current from output 452 through resistor 458 to ground. Transistor 466 is operated in the inverted mode, having its emitter coupled to integrator circuit input 462, its collector coupled to ground and its base coupled to computing circuit input 450 through resistor 472, and provides an accurate ground potential at integrator circuit input 462 when turned on.

As previously stated, the duty cycle of the pulsating signal is directly proportional to the elapsed time and is defined as the percentage of time during each period that the alternating signal is in the 0-state. The frequency of the alternating signal is fixed and, thus, the period 478, shown in FIG. 8a, which is equal to the inverse of the frequency, is also fixed, and the 0-state pulse width is directly proportional to the elapsed time. Thus, only during the interval representing the elapsed time is the speed signal on output 452 coupled to input 462.

Integrator circuit 456 includes an operational amplifier 480 having an inverting input 482, a normal input 484 and output 452 on which the speed signal is produced. Normal input 484 is coupled to a reference potential, such as ground, through resistor 486. This configuration necessitates that a virtual ground exists at inverting input 482. Integration is provided through integrating feedback capacitor 488 coupling output 452 with inverting input 482. Inverting input 482 is also coupled to integrator circuit input 462 through resistor 483 and to a fixed supply voltage 490 through resistor 492. Fixed supply voltage 490 is negative with respect to ground and for purposes of this description may be considered as representing a fixed distance signal.

Operational amplifier 480 will adjust the magnitude of its speed output signal to maintain the average voltage at inverting input 482 equal to the voltage at normal input 484, which is ground. In order to keep this virtual ground at inverting input 482, the junction 496 between resistors 492 and 483, the average voltage at integrating circuit input 462 must be a positive voltage with respect to ground having a magnitude equal to the magnitude of supply voltage 490 times the ratio of the resistance value of resistor 482 to the resistance value of resistor 492. Similarly, in order to get this average voltage at input 462, the average magnitude of the speed signal must be equal to the magnitude of supply voltage 490 times the ratio of the sum of the resistance values of resistors 458, 460 and 482 to the resistance value of 492. Thus, it can be seen for a relatively low duty cycle, with input 462 coupled to ground during a great portion of each period of the pulsating signal and coupled to the speed signal for only a short time during each period, the average magnitude of the speed signal must be relatively large. If the duty cycle is relatively large, output 452 is coupled to input 462 for a relatively long time during each period and, thus, the magnitude of the speed signal need not be as great in order to maintain the average magnitude of input 462 at the aforementioned value to keep a virtual ground at junction 496. Therefore, as the value of the duty cycle increases, corresponding to an increasing elapsed time and a decreasing flow rate, the average magnitude of the speed signal decreases directly with the inverse of the elapsed time and, thus, linearly varies with speed and flow rate. A speed signal corresponding to the representative pulsating signal shown in FIG. 8a is shown in FIG. 8b.

Analytically, the basic equation for the magnitude of the speed signal at the end of a 1-state pulse of the alternating signal is:

Equation 1:

$$S_{1,n+1} = S_{o,n} - V_d (t_1/R_d C)$$

where:

$S_{1,n+1}$ = the magnitude of the speed signal at the end of the $N+1^{st}$ 1-state pulse of the alternating signal, $S_{o,n}$ = the magnitude of the speed signal at the end of the Nth, 0-state pulse immediately preceding and ending at the beginning of the Nth, 1-state pulse of the alternating signal, $V_d$ = the negative magnitude of supply voltage 490, $t_1$ = pulse width of the 1-state pulse which is indirectly proportional to the duty cycle, $R_d$ = resistance value of resistor 472, $C$ = capacitance value of capacitor 488, and the basic equation for the magnitude of the speed signal at the end of a 0-state pulse of the alternating signal is:

$$S_{o,n+1} = \frac{R_f C}{R_f C + t_2} S_{1,n} - \frac{V_d R_2 t_2}{R_d (R_2 C + t_2)} \quad (2)$$

where:

$S_{o,n+1}$ = the magnitude of the speed signal at the end of the $N+1^{st}$, 0-state pulse of the alternating signal, $S_{1,n}$ = the magnitude of the speed signal at the end of the Nth, 1-state pulse immediately preceding and ending at the beginning of the $N+1^{st}$, 0-state pulse of the alternating signal, $R_f$ = the sum of resistors 458, 460 and 462, and $t_2$ = the pulse width of the 0-state pulse which is directly proportional to the duty cycle.

Now referring to Equations 1 and 2, the representative waveform of the speed signal shown in FIG. 8b can be analyzed. As can be seen, the voltage decrease δ2 of the speed signal during each 0-state pulse 476 of the alternating signal decreases with time. This is apparent from Equation 2 because the decrease δ2 is directly proportional to $S_{1,n}$, the magnitude of the speed signal at the beginning of each 0-state pulse, which decreases with time. Note, also, that the voltage increase δ1 of the speed signal during each 1-state pulse 474 remains constant with time. Referring to Equation 1, this increase δ1 is equal to $V_d (t_1/R_d C)$ which is a constant directly proportional to $t_1$ and the flow rate, which, in turn, is inversely proportional to the duty cycle and the elapsed time.

After a number of cycles, depending upon initial conditions, δ1 equals δ2, and the steady state DC value 492 is reached which is directly proportional and linearly related to flow rate. This steady state value is totally determined by the duty cycle. If the duty cycle is relatively large, corresponding to a relatively flow flow rate, the 1-state pulse width and the magnitude of δ1 will be proportionately small and, thus, the speed signal will have reached a correspondingly low steady state value before δ2 has decreased to a magnitude equal to δ1. Conversely, if the duty cycle is relatively small corresponding to a relatively fast flow rate, the 1-state pulse width and the magnitude of δ1 will be proportionately large, and the magnitude of δ2 will not have so far to decrease before it equals the magnitude of δ1 and, thus, the steady state DC value of the speed signal will be relatively large.

Thus, in summary, the linear readout flow meter comprises four basic circuits. Timing and control logic circuit 44 controls elapsed time measuring circuit 46 in response to start detector 18, stop detector 24 and the operator controls, test start, test stop and manual reset. The time measuring circuit generates an elapsed time signal, that is converted to an alternating signal by converter circuit 50, which, in turn, is converted by computer circuit 52 into a speed signal inversely proportional to the elapsed time, the magnitude of which is indicated by meter 38.

The sequence of operations, for the most part, is automatic. At the beginning of a sequence, the timing and read lamps are off and the ready lamp is on. Meter 31 indicates maximum flow rate during the ready period, for the timing and control logic circuit is transmitting a stop timing and a reset signal, thus keeping timing capacitor 257 discharged, which corresponds to the maximum measurable rate. When a bubble is detected by start detector 18, control circuit 44 simultaneously transmits start and enable signals, timing capacitor 257 starts to linearly charge, the duty cycle of the pulsating signal increases and the flow rate indication of meter 31 decreases. It should be noted that although for purposes of illustration the speed signal output shown in FIG. 8b is shown as first beginning to vary after the duty cycle of the pulsating signal shown in FIG. 8a has reached a steady state, the speed signal reacts to the variation of the duty cycle of the pulsating signal at the start of the timing period, and thus reaches a steady state much earlier in the read period than indicated in FIG. 8b.

The timing period ends and the read period begins when the bubble reaches stop detector 24. At the end of the timing period, control circuit 44 generates a stop signal, timing capacitor is disconnected from the timing constant current source, the timing lamp turns off and the read lamp turns on. The compensating circuit 269 keeps the elapsed time signal constant, the duty cycle of the attenuating signal and the speed signal assume corresponding steady state values, and a meter reading is taken.

At the end of the read period, read lamp turns off, stop flip-flop 154 is automatically reset, preset period one shot 218 is set, and a reset signal is generated to discharge the timing capacitor. At the end of the preset period, timing capacitor 256 is completely discharged, the control and elapsed time measuring circuits are ready for another measurement, and, appropriately, lamp 26 turns on. An automatic bubble injector may automatically inject another bubble in response to ready lamp 26 turning on, or an operator may then elect to manually inject another bubble to take another measurement.

We claim:

1. Apparatus for determining the speed of a moving substance, comprising:
    means for measuring the time elapsed for the substance to travel a fixed distance; and
    means coupled to said time measuring means for generating a speed signal representing the inverse of the elapsed time, said signal being linearly related to the speed of the substance and convertible into a speed indication, said speed signal generating means including means for generating a pulsating signal having a duty cycle directly proportional to the elapsed time.

2. The apparatus of claim 1 wherein said speed signal generating means includes
    computing means responsive to said pulsating signal for generating the speed signal, said speed signal having an average magnitude inversely proportional to said duty cycle.

3. The apparatus of claim 1 including means responsive to the speed signal to provide an indication of speed and wherein said speed signal generating means includes an integrator circuit coupled between said pulsating signal generating means and said speed indicating means.

4. The apparatus of claim 3 wherein said pulsating signal has a fixed frequency and alternates between first and second states during each period thereof, said duty cycle being the percentage of time that said pulsating signal is in said first state during each period, said integrator circuit has an input and an output for providing said speed signal, and
    said speed signal generating means includes
    means for coupling the integrator circuit output to the integrator circuit input,
    a source of reference potential, and
    switch means for shorting said integrator circuit input to said reference potential in response to said pulsating signal assuming said second state.

5. The apparatus of claim 4 wherein said integrator circuit comprises
    an operational amplifier having an inverting input, a normal input and an output,
    a first impedance means coupling the normal input to the reference potential,
    a capacitor coupling the amplifier output to the inverting input, said amplifier output comprising said circuit output,
    a second impedance means coupling a fixed voltage, negative with respect to said reference potential, to the inverting input and capacitor, and
    a third impedance means coupling the circuit input to the inverting input.

6. The apparatus of claim 3 wherein said pulsating signal alternates between first and second states during each period thereof, said duty cycle being the percentage of time that said pulsating signal is in said first state during each period, said integrator circuit having an output for producing said speed signal,
    the magnitude of the speed signal at the end of each second state pulse being represented by, $$S_{1,n+1} = S_{o,n} - K_1 t_1$$

where:

$S_{1,n+1}$ + the magnitude of the speed signal at the end of the $N + 1^{st}$ second state pulse of the pulsating signal, $S_{o,n}$ = the magnitude of the speed signal at the end of the $N^{th}$ first state pulse immediately preceding the $N^{th}$ second state pulse, $K_1$ = a negative constant $t_1$ = the pulse width of the second state pulse, and the magnitude of the speed signal at the end of each first state pulse being represented by, $$S_{o,n+1} = \frac{K_2}{K_2 + t_2} S_{1,n} - \frac{K_3 t_2}{K_4 + K_5 t_2}$$

where:

$S_{o,n+1}$ = the magnitude of the speed signal at the end of the $N + 1^{st}$ first state pulse of the alternating signal, $S_{1,n}$ = the magnitude of the speed signal at the end of the $N^{th}$ second state pulse immediately preceding the beginning of the $N^{th}$ first state pulse, $t_2$ = pulse width of the first state pulse, $K_3$ = a negative constant $K_2$, $K_4$, $K_5$ = positive constants.

7. Apparatus for determining the speed of a moving substance, comprising:

means for measuring the time elapsed for the substance to travel a fixed distance including means for generating a signal having a magnitude directly proportional to the elapsed time, start and stop detectors spaced apart said fixed distance along the path of motion of said moving substance, a timing means including a timing capacitor, a timing constant current source, means for coupling said timing current source to said timing capacitor to charge the capacitor linearly in response to said substance being detected by said start detector and uncoupling said timing current source from said capacitor in response to said substance being detected by said stop detector, the charge across the capacitor having a magnitude directly proportional to the elapsed time, the voltage across said capacitor decreasing due to polarization losses immediately after said timing current source is uncoupled therefrom, and said timing means including compensating means for keeping said voltage at a constant voltage level equal to the voltage level at the time of uncoupling; and means coupled to said time measuring means for generating a speed signal representing the inverse of the elapsed time, said signal being linearly related to the speed of the substance and convertible into a speed indication.

8. The apparatus of claim 7 wherein said compensating means includes a compensating current source, a switch for coupling the compensating current source with the timing capacitor and a compensating capacitor connected across the switch, said switch turning on in response to the substance being detected by the start detector to conduct a small portion of the total charging current for the timing capacitor from the compensating current source and turning off in response to the substance being detected by the stop detector, said compensating capacitor conducting a compensating charging current from the compensating current source to the timing capacitor for said short period of time immediately after said timing capacitor is uncoupled from the timing current source to compensate for the polarization losses thereof.

9. The apparatus of claim 8 wherein the voltage across the timing capacitor slowly decrease due to leakage losses and said compensating means includes an impedance means connected in parallel with said compensating capacitor to conduct a small charging current to the timing capacitor to compensate for the leakage losses thereof.

10. Apparatus for determining the speed of a moving substance, comprising:

means for measuring the time elapsed for the substance to travel a fixed distance including means for generating a signal having a magnitude directly proportional to the elapsed time; and means coupled to said time measuring means for generating a speed signal representing the inverse of the elapsed time, said signal being linearly related to the speed of the substance and convertible into a speed indication, said speed signal generating means including means for generating a pulsating signal having a duty cycle directly proportional to the magnitude of said elapsed time signal.

11. The apparatus of claim 10 wherein said pulsating signal generating means includes means for generating a periodic signal at a fixed frequency, the absolute magnitude of said periodic signal having a first value at the beginning of each period and linearly increasing toward a second value during each period, storage means having an output assuming a second state at the beginning of each period and assuming a first state in response to the magnitude of said linearly increasing signal reaching a preselected percentage of the magnitude of said elapsed time signal.

12. The apparatus of claim 11 wherein said periodic signal generating means includes a differential amplifier having a normal input, an inverting input and an output, said elapsed time signal coupled to said inverting input, said linearly increasing signal coupled to said normal input, said amplifier generating an output signal having a magnitude directly proportional to the arithmetic difference between the magnitude of said elapsed time and linearly increasing signals, said storage means coupled to said amplifier output and assuming said second state in response to said amplifier output assuming a preselected value.

13. The apparatus of claim 11 wherein said periodic signal generating means includes a capacitor, means for linearly charging the capacitor toward the second value at a uniform rate in response to said output assuming the second state, means for discharging the capacitor to the first value in response to said output assuming said first state.

14. The apparatus of claim 10 wherein said speed signal generating means includes
    means for generating a speed signal having an average magnitude inversely proportional to said duty cycle, said speed signal being directly proportional to the speed of the substance.

15. Apparatus for determining the speed of a moving substance, comprising:
    means for measuring the time elapsed for the substance to travel a fixed distance including
    means for generating a timing signal representing the time elapsed for the substance to travel said fixed distance, and
    means for storing said elapsed time signal for a preselected read period; and
    means coupled to said time measuring means for generating a speed signal representing the inverse of the elapsed time, said signal being linearly related to the speed of the substance and convertible into a speed indication.

16. The apparatus of claim 15 wherein the timing signal generating means must be reset prior to each elapsed time measurement and said elapsed time measuring means includes means for automatically resetting said timing signal generating means at the end of said read period.

17. The apparatus of claim 15 wherein the storage means must be reset to an initial condition wherein no signal is stored and said time measuring means includes means for resetting said storage means at the end of the read period.

18. The apparatus of claim 15 wherein said time measuring means includes means for giving a read indication throughout said read period.

19. Apparatus for determining the speed of a moving substance, comprising:
    means for measuring the time elapsed for the substance to travel a fixed distance including
    means for indicating that an elapsed time measurement is being made; and
    means coupled to said time measuring means for generating a speed signal representing the inverse of the elapsed time, said signal being linearly related to the speed of the substance and convertible into a speed indication.

20. The apparatus of claim 19 wherein said time measuring means includes means for indicating that said elapsed time measuring means is ready to make another measurement in response to both said timing signal generating means and said storage means being reset.

* * * * *